United States Patent
Hsiao

(10) Patent No.: US 7,596,155 B2
(45) Date of Patent: Sep. 29, 2009

(54) METHOD AND APPARATUS FOR PACKET ERROR DETECTION

(75) Inventor: Li-Ting Hsiao, Taipei (TW)

(73) Assignee: VIA Technologies, Inc., Taipei (TW)

( * ) Notice: Subject to any disclaimer, the term of this patent is extended or adjusted under 35 U.S.C. 154(b) by 534 days.

(21) Appl. No.: 11/382,719

(22) Filed: May 11, 2006

(65) Prior Publication Data
US 2007/0116066 A1    May 24, 2007

(30) Foreign Application Priority Data
Oct. 13, 2005    (TW) ............................... 94135678 A

(51) Int. Cl.
*H04J 3/07* (2006.01)
(52) U.S. Cl. ........................ 370/506; 714/776
(58) Field of Classification Search ................ 370/506, 370/509, 503
See application file for complete search history.

(56) References Cited

U.S. PATENT DOCUMENTS

| | | | | |
|---|---|---|---|---|
| 5,761,707 A | * | 6/1998 | Aiken et al. ................. | 711/118 |
| 6,691,192 B2 | * | 2/2004 | Ajanovic et al. ............ | 710/107 |
| 7,246,303 B2 | * | 7/2007 | Bansal et al. ................ | 714/800 |
| 2005/0141661 A1 | * | 6/2005 | Renaud et al. ............... | 375/372 |

OTHER PUBLICATIONS

China Office Action mailed Aug. 24, 2007.
PCI Express Base Specification, PCI SIG, pp. 152-154, PCI-SIG Apr. 29, 2002.

* cited by examiner

*Primary Examiner*—Derrick W Ferris
*Assistant Examiner*—Mohammad Anwar
(74) *Attorney, Agent, or Firm*—Thomas, Kayden, Horstemeyer & Risley

(57) ABSTRACT

The invention provides a packet error detecting method for a PCI express bus link. When a start framing symbol of a packet appears at the PCI express bus link, the start framing symbol is ignore if a predetermined error condition is satisfied.

24 Claims, 3 Drawing Sheets

METHOD AND APPARATUS FOR PACKET ERROR DETECTION

BACKGROUND

1. Field of the Invention

The invention is related to data processing and, more particularly, to a method and apparatus for packet error detection on a PCI Express Bus link.

2. Description of the Prior Art

Data transfer over PCI express bus link interface is based on data packets. Two packet formats, TLP (transaction layer packet) and DLLP (data link layer packet), are defined in the PCI express bus specification. A receiver of a PCI express bus link should identify packet format, and accordingly perform the processes of receiving, buffering and transferring data.

FIGS. 1A and 1B respectively illustrate packet formats of TLP and DLLP defined in the PCI express bus specification. As shown in FIG 1A, a TLP packet has 1-byte start framing symbol 111, 2-byte sequence number 112, 3 or 4-doubleword header 113, 0~4 Kbyte data 114 (should be multiple of 4), 8-byte CRC data 115 and 1-byte end framing symbol 116. As shown in FIG. 1B, a DLLP packet has 1-byte start framing symbol 121, 4-byte data 122, 2-byte CRC data 123 and 1-byte end framing symbol 124.

There is no error detection defined in the PCI express bus specification, it is assumed that all packets are correctly received when the transceiver of a PCI express bus link transmits packets. Packet error detection mechanism at receiver of the PCI express bus link is thus required to prevent unpredictable errors.

SUMMARY

The invention provides a packet error detecting method for a PCI express bus link. When a start framing symbol of a packet is detected at the PCI express bus link, the start framing symbol is ignored if a predetermined error condition is satisfied. Thus, no packet is left unfinished, such that system function error can be avoided.

The invention further provides a packet error detecting apparatus for a PCI express bus link. The apparatus at least includes: a processor coupled to a PCI express bus link for receiving, buffering and processing data, and a packet checking device coupled to the PCI express bus link for checking if a start framing symbol of a packet appears. The packet checking device informs the processor to ignore the start framing symbol, if a predetermined error condition is satisfied.

DESCRIPTION OF THE DRAWINGS

The accompanying drawings, incorporated in and constituting a part of this specification, illustrate embodiments of the invention and, together with the description, serve to explain the features, advantages, and principles of the invention.

DETAILED DESCRIPTION

Figure 1A:
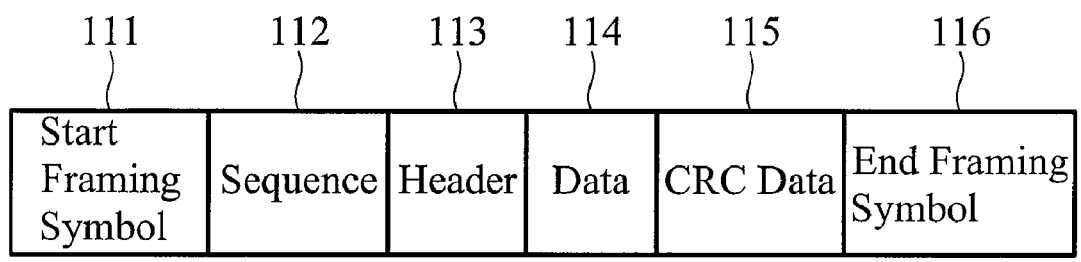
FIGS. 1A and 1B illustrate two packet formats defined in the PCI express bus specification.
Figure 1B:
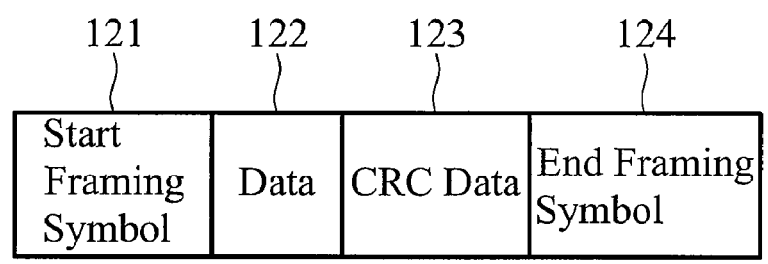

As mentioned earlier, a DLLP packet has a fixed data length of 8 bytes. When a start framing symbol of a packet appears and defines (or indicates) the packet is a DLLP packet, the transaction can be completed without concern after receiving the 8-byte data. On the contrary, if the start framing defining (or indicating) the packet is a TLP packet, due to the uncertain data length thereof, it is necessary to detect and finish transmission of the TLP packet to avoid incorrect reception and function error in the receiver of a PCI express bus link.

Additionally, the PCI express bus link specification allows for x1, x2, x4, x8, x12, x16, and x32 lanes. When number of lanes exceeds 1, the packet should be transmitted sequentially according to the lane order, and the lane by which the start framing symbol can be transmitted is identified. That is to say, if the start framing symbol of the packet isn't delivered (or transmitted) by the appropriate lane, some processes should be performed following.

The invention provides a method to determine whether a predetermined error condition is satisfied when a start framing symbol of a packet appears in the PCI express bus link. If the predetermined error condition is met, the start framing symbol is ignored to prevent unpredictable function errors of the PCI express bus link. Otherwise the data is sequentially received in predetermined rules.

As the descriptions above, the predetermined error condition could be: the current packet is not finished however a next packet starts to be transmitted in the PCI express bus link. Because packets of the PCI express bus link are transmitted in serial and not in parallel or pipeline, thus it's unacceptable for starting a next packet transmission without finishing the current packet transmission which would cause a functionally unsolvable problem. Such situation could be resulted from missing the end framing symbol. According to the present invention, the problem is solved by ignoring the start framing symbol of the next packet, as a result, the receiver of the PCI express bus link could still receive the current packet and finish the current packet by the end framing symbol of the current packet.

As the descriptions above, the predetermined error condition could also be: if a start framing symbol doesn't appear in the first lane (lane 0) of the PCI express bus link, the previous lane of the lane with a start framing symbol appeared doesn't exist an end framing symbol. For example, assume a PCI express bus link has 16 lanes (lane 0~lane 15), and a start framing symbol appears at lane 8 while no packet end symbol is transmitted by lane 7. Such condition could be resulted from unrecognizing the end framing symbol at the pervious lane due to an error signal of the PCI express bus link. In the present invention, the problem is solved by ignoring the start framing symbol of the present lane, and finishing the previous packet by the following end framing symbol.

The packet errors as described above are expectable. By applying the present invention, packets on the PCI express bus link can be completed to prevent system error. When processing a packet and an error is detected, the receiver of the PCI express bus link may request the transceiver of the PCI express bus link to retransmit the error received packet. Otherwise, when the ignored packet isn't received after a period of time, the receiver would also request the transceiver to retransmit the lost packet.

Figure 2:
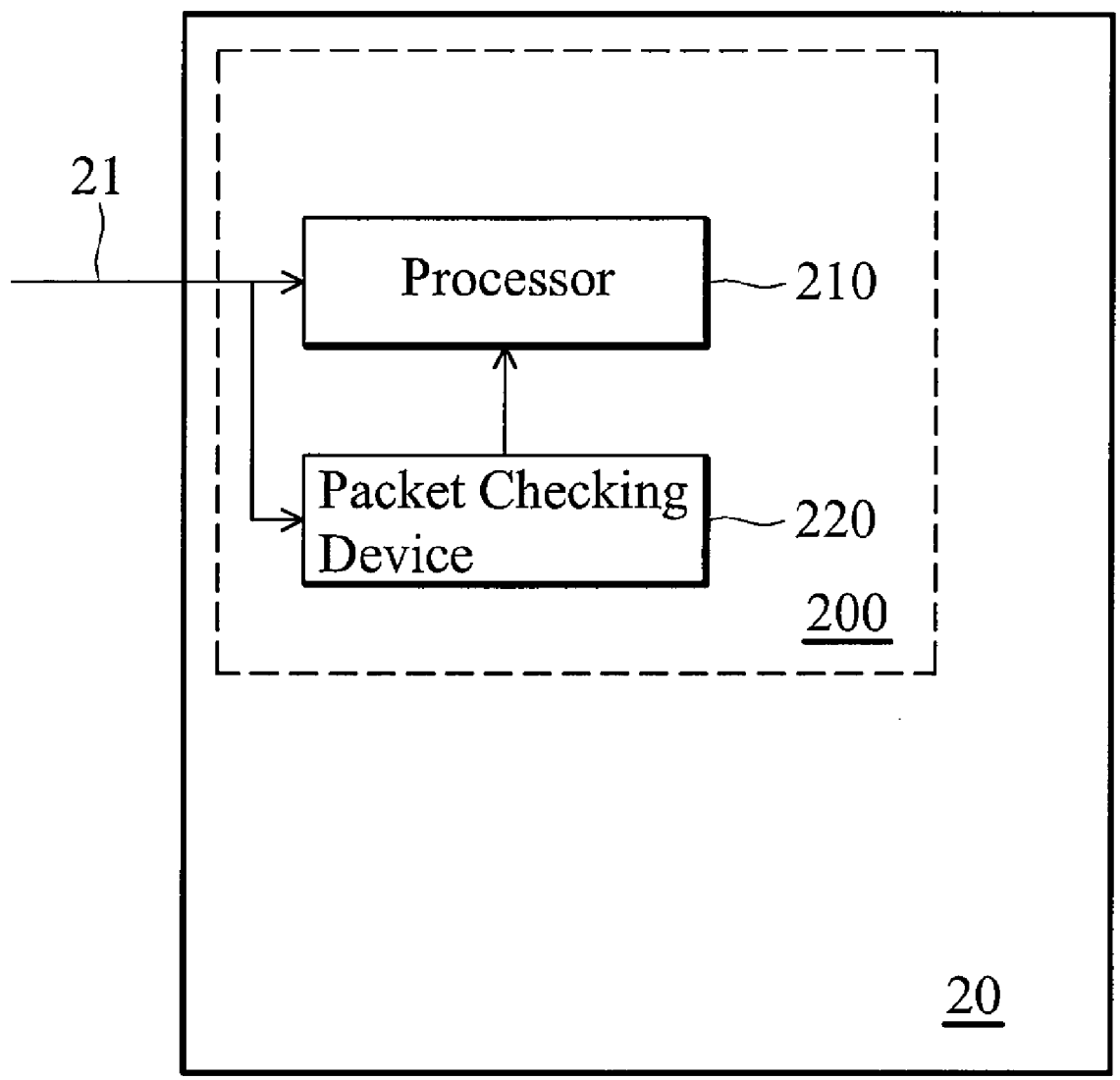
FIG. 2 is a block diagram of a packet error detection means according to the present invention.

FIG. 2 is a block diagram of a packet error detecting apparatus 200 according to the present invention. The packet error detecting apparatus 200 is implemented in a device 20 of a receiving terminal of a PCI express bus link 21. The packet error detecting apparatus 200 at least includes: a processor 210 coupled to PCI express bus link 21 for receiving, buffering and processing data; and a packet checking device 220 coupled to the PCI express bus link 21 for checking or monitoring whether a start framing symbol appears in the PCI express bus link 21.

Figure 3:
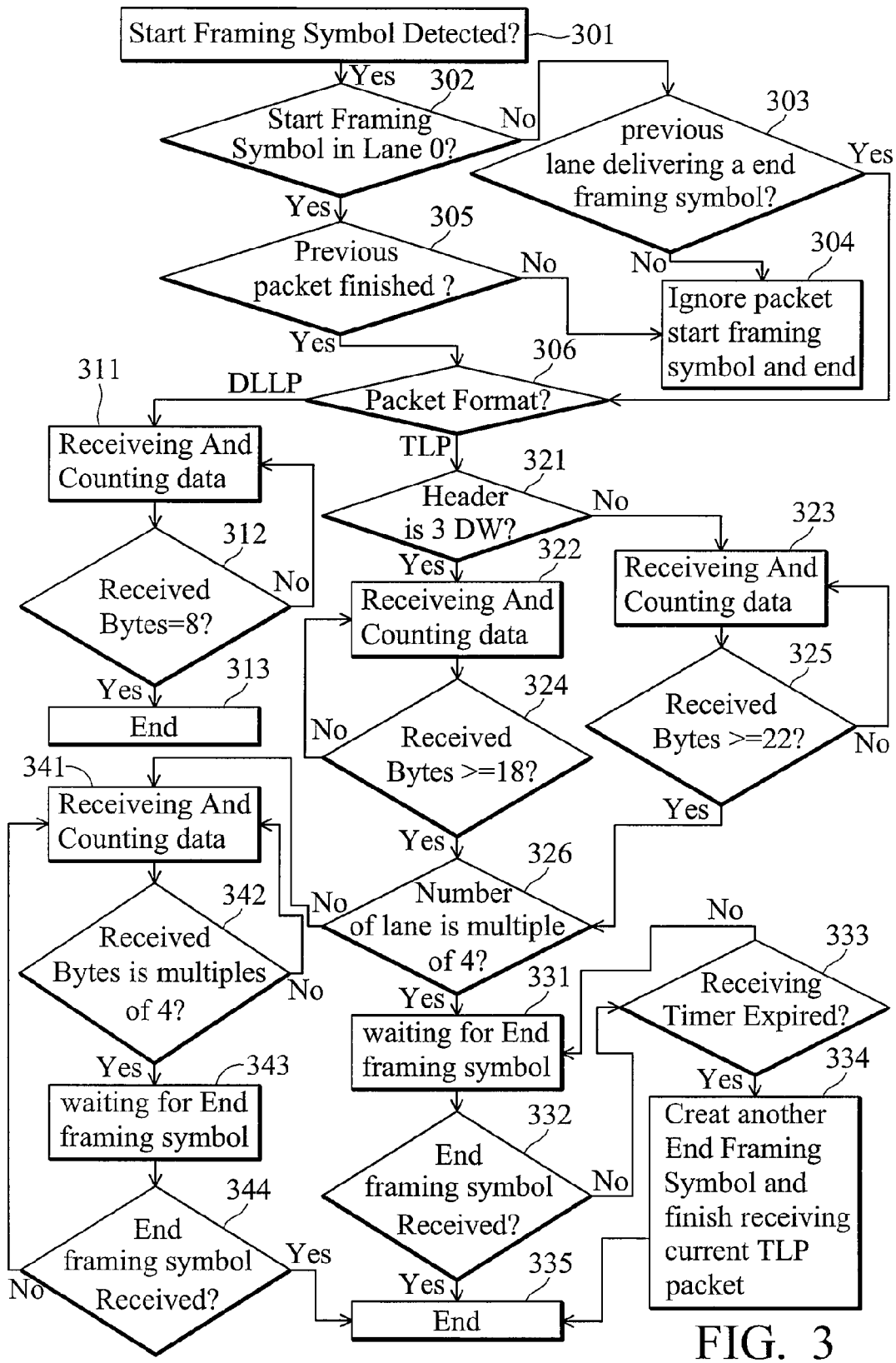
FIG. 3 is a flowchart illustrating a packet error detection method according to the present invention.

FIG. 3 is a flowchart of a packet error detecting method 300 according to the present invention, described as cooperating with apparatus 200 of FIG. 2.

At step 301 of the method 300, the packet checking device 220 checks whether a start framing symbol of a packet appears in the PCI express bus link 21. At step 302, when the start framing symbol appears (or is detected) in the PCI express bus link, the packet checking device 220 checks if the start framing symbol is in lane 0. If the start framing symbol is not in lane 0, goes to step 303; else goes to step 305. At step 303, the packet checking device 220 checks if the previous lane of the lane with the start framing symbol has delivered an end framing symbol, if the previous lane has not delivered the end framing symbol, goes to step 304; else goes to step 306. At step 304, the packet checking device 220 informs the processor 210 to ignore the start framing symbol and end the reception. At step 305, the packet checking device 220 checks if the previous packet is finished (by checking if an end framing symbol is received or not). If the previous packet is finished, goes to step 306, else goes to step 304. At step 306, the processor 210 identifies the packet format according to the receiving start framing symbol.

If the start framing symbol isn't ignored and the start framing symbol defining the receiving packet is a DLLP packet, the processor 210 sequentially receives the 8-byte data (Steps 311 and 312). After that, the processor 210 goes to step 313 to end the reception of the DLLP.

If the start framing symbol isn't ignored and the start framing symbol defining the receiving packet is a TLP packet, the following steps are took in order. As described above, header of TLP could be 3 or 4-doubleword (DW), as a result, the processor 210 firstly determines the header of the receiving TLP is 3 DW or 4 DW according to the start framing symbol (step 321). If the header is 3 DW then goes to step 322; else the header is 4 DW and then goes to step 323. At step 322 and 324, the processor 210 starts to receive data after receiving the 3-DW length header (i.e. if number of receiving bytes is substantially equal or more than 18 bytes, the header is received.). At steps 323 and 325, the processor 210 starts to receive data after receiving the 4-DW length header (i.e. if the number of receiving bytes is substantially equal or more than 22 bytes, the header is received).

According to PCI express specification, data length of a TLP packet should be multiple of 4 bytes. If the number of lane of the PCI express bus is multiple of 4, the processor 210 would continuously checks whether an end framing symbol is received. When the end framing packet is received, the processor 210 ends the reception (Steps 331, 332 and 335). If the end framing packet isn't received in a predetermined period time (i.e., receiving timer expired), the processor 210 ask to create another end framing symbol to finish receiving current TLP, and then the reception is ended (steps 333, 334 and 335). If the number of lane of the PCI express bus is multiple of 4, the processor 210 checks if the following byte is an end framing symbol when the number of receiving byte is multiple of 4 (step 341 and 342). When the end framing packet is received, the processor 210 ends the reception (Steps 343 and 344).

As described, the invention provides not only error detection, i.e. a previous packet not finished, to prevent function error in a PCI express bus link, but also identification of an unfinished packet. A DLLP packet is regarded as unfinished until proceeding Step 313, and a TLP packet is also regarded as unfinished until proceeding Step 335. By implementation of embodiments of the invention, no packet is left unfinished, such that system function error can be prevented.

While the invention has been described by way of example and in terms of preferred embodiment, it is to be understood that the invention is not limited thereto. Those skilled in the technology can still make various alterations and modifications without departing from the scope and spirit of this invention. Therefore, the scope of the present invention shall be defined and protected by the following claims and their equivalents.

What is claimed is:

1. A packet error detecting method comprising:
   determining if a start framing symbol of a packet appears in a PCI express bus link; and
   ignoring the start framing symbol when a predetermined error condition is satisfied; the PCI express bus link comprises at least two lanes to transmit the packet,
   wherein a first lane is defined as lane 0; and
   the start framing symbol is ignored when the lane with the start framing symbol is not the lane 0 and a previous lane which received the start framing symbol has no end framing symbol.

2. The method as claimed in claim 1, wherein the start framing symbol is ignored if a current processing packet is not finished.

3. The method as claimed in claim 1, further comprising receiving data corresponding to packet format defined by the received start framing symbol if the start framing symbol is not ignored.

4. The method as claimed in claim 3, wherein the .packet is a DLLP packet.

5. The method as claimed in claim 4, further comprising ending the reception of the packet after receiving 8 bytes of data of the packet.

6. The method as claimed in claim 5, wherein the packet is a TLP packet.

7. The method as claimed in claim 6, further comprising: receiving a header; receiving data; and ending the reception after receiving an end framing symbol of the packet.

8. The method as claimed in claim 7, further comprising: if the start framing symbol defining the header is 3-doubleword length, the data receiving is not finished until the number of received bytes is substantially equal or more than 18.

9. The method as claimed in claim 7, further comprising: if the start framing symbol defining the header is 4-doubleword length, the data receiving is not finished until the number of received bytes is substantially equal or more than 22.

10. The method as claimed in claim 7, wherein the number of the lanes of the PCI express bus is a multiple of 4.

11. The method as claimed in claim 7, wherein if the number of the lane of the PCI express bus is not a multiple of 4, the method further comprises: checking if the following byte is the end framing symbol when the number of receiving bytes is a multiple of 4.

12. The method as claimed in claim 7, further comprising: if the end framing symbol is not received after a predetermined period of time, creating another end framing symbol to end the reception.

13. The method as claimed in claim 1, wherein the method is applied to a receiver of the PCI express bus link.

14. A packet error detecting apparatus comprising:
   a processor coupled to a PCI express bus link for receiving, buffering and processing data of a packet; and
   a packet checking device coupled to the PCI express bus link for checking if a start framing symbol of the packet appears in the PCI express bus link; wherein the packet checking device informs the processor to ignore the start framing symbol, if a predetermined error condition is satisfied;

the PCI express bus link comprises at least two lanes to transmit the packet, wherein a first lane is defined as lane 0; and the packet checking device informs the processor to ignore the start framing symbol when the lane with the start framing symbol is not lane 0 and a previous lane which receives the start framing symbol has no end framing symbol.

15. The apparatus as claimed in claim 14, wherein the packet checking device informs the processor to ignore the start framing symbol when a current processing packet is not finished.

16. The apparatus as claimed in claim 14, if the start framing symbol is not ignored, the processor receives data according to the packet format defined by the receiving start framing symbol.

17. The apparatus as claimed in claim 16, wherein the start framing symbol defines the packet as a DLLP packet, and the processor ends the reception after receiving 8 bytes of data.

18. The apparatus as claimed in claim 16, wherein the start framing symbol defines the packet as a DLLP packet, and the processor receives a header, defined by the start framing symbol, and data, then finishes the reception after receiving an end framing symbol of the packet.

19. The apparatus as claimed in claim 18, wherein if the start framing symbol defining the header is 3-doubleword length, the processor starts to receive data after the number of received bytes is substantially equal or more than 18.

20. The apparatus as claimed in claim 18, wherein if the start framing symbol defining the header is 4-doubleword length, the processor starts to receive data after the number of received bytes is substantially equal or more than 22.

21. The apparatus as claimed in claim 18, wherein if number of lanes of the PCI express bus is a multiple of 4, the processor continuously checks when the end framing packet is received.

22. The apparatus as claimed in claim 18, wherein if number of lanes of the PCI express bus is not a multiple of 4, the processor checks if the following byte is the end framing symbol when number of receiving byte is a multiple of 4.

23. The apparatus as claimed in claim 18, wherein if the end framing symbol is not received after a predetermined period of time, the processor ask to create another end framing symbol to end the reception.

24. The apparatus as claimed in claim 14, wherein the device is coupled to a receiving terminal of the PCI express bus link.

* * * * *